United States Patent [19]
McConnell et al.

[11] 3,872,499
[45] Mar. 18, 1975

[54] TELEVISION PICTURE CORRECTION

[75] Inventors: Eric Douglas McConnell; Joseph Colin Whitehouse, both of Leicester, England

[73] Assignee: The Rank Organisation Limited, London, England

[22] Filed: Aug. 2, 1973

[21] Appl. No.: 384,946

[30] Foreign Application Priority Data

Aug. 25, 1972 United Kingdom ............ 39774/72

[52] U.S. Cl. ............................ 358/51, 178/DIG. 29
[51] Int. Cl. ............................................ H04n 9/10
[58] Field of Search ......... 178/5.4 M, 5.4 R, 7.5 SE, 178/DIG. 6, DIG. 29, 5.4 TL, 5.4 E, 5.4 ES, 5.2 D, 6.8, 7.85, DIG. 27; 352/140; 350/184, 187; 358/51

[56] References Cited

UNITED STATES PATENTS 3,288,921 11/1966 James et al. ................ 178/DIG. 29
3,692,918 9/1972 Olson et al. ......................... 178/5.4
3,705,328 12/1972 Torok ................................ 178/7.5

*Primary Examiner*—Robert L. Griffin
*Assistant Examiner*—R. John Godfrey
*Attorney, Agent, or Firm*—Brisebois & Kruger

[57] ABSTRACT

Misregistration in a multi-scanning television system such as a colour television camera as a result of variation of an optical parameter such as a zoom lens setting is compensated automatically by varying the size of one or more of the scanned areas in the pickup tubes of the system, for example by modifying the deflection coil current, using signals derived from variations of lens setting parameters for example potentiometrically.

11 Claims, 8 Drawing Figures

TELEVISION PICTURE CORRECTION

This invention relates to television systems, and more particularly to the correction of errors introduced by an optical system such as a camera lens.

One application of the invention is specifically concerned with a colour television system including a camera having a zoom lens. It is known in colour television to provide a setting-up adjustment of the scanning of camera tubes to obtain correct registration of the separation images on the tubes. however, when a zoom lens is used, subsequent variation of the zoom setting causes the separation images to vary slightly in size, introducing a misregistration. The magnitude of this is typically about 1 percent of the total picture height, but this is noticeable particularly between the red and green channels. This degree of misregistration usually varies over the height and width of the picture area but is only considered more serious if it is bad in the central portions of the picture area.

Although zoom setting is the main cause of such misregistration, unacceptable misregistration may also arise from variations in iris and focus settings.

It is therefore an object of this invention to obviate or mitigate the above disadvantages.

One aspect of the present invention accordingly provides a method of compensating for misregistration in a multi-scanning television system having an optical system of variable parameters, in which the size of at least one scanned area is varied automatically in dependence on the value of at least one of said parameters.

The invention also provides, in a multi-scanning television system having an optical system of variable parameters, means for deriving a signal representing the value of at least one of said parameters, and means responsive to said signal for controlling automatically the size of at least one scanned area.

According to another aspect of the invention, there is provided a method of compensating for misregistration of colour separation images on corresponding pickup tubes in a television camera having a zoom lens, the misregistration being caused by variation of at least one of the zoom, iris and focus settings of the lens, the method comprising monitoring the value of the or each setting to derive a signal representative thereof, and using said signal to control the scanned area in at least one of the pickup tubes.

The signal may be used to modify differential scanning signals in the camera. Alternatively, the signal may be used to modify the voltage drive into one or more deflection amplifiers. A further possibility is that the signal is applied to one or more scan coil sensing resistors.

A further aspect of the present invention provides a television camera for use with a zoom lens, including a plurality of pickup tubes arranged to receive colour separation images, scan control means for controlling the scan of each pickup tube to be a raster of a given size, means for providing a signal representing the value of an operational parameter of the lens, and compensating circuit means arranged to receive said signal and effective to modify the scan control means to alter the raster size of at least one tube in dependence on the lens parameter.

Preferably, the scan control means comprises a deflection generator supplying deflection coils for each tube via respective deflection amplifiers.

The compensating circuit means may conveniently comprise signal generating means for adding to or subtracting from at least one output of the deflection circuit a signal whose amplitude corresponds to the value of the lens parameter. The signal generating means is suitably a sawtooth wave generator synchronised in phase with the deflection generator. The amplitude of the sawtooth signal may be directly modulated by said parameter, or the signal may be fed to the deflection generator output via an amplifier whose gain is controlled by said parameter.

As an alternative, each scan coil may have associated therewith a scan coil current sensing resistor, the compensating circuit means comprising means for applying a signal representing said parameter across at least one of the sensing resistors. In this case, the compensating circuit means may comprise a potentiometer, or a current source (which is suitably a field-effect transistor).

A further arrangement is that the compensating circuit means acts to modify at least one differential signal controlling the deflection generator, the compensating circuit means ppreferably comprising a summing circuit.

In any embodiment of this aspect of the invention, the lens parameter may be any one or more of its zoom, iris and focus settings.

Embodiments of the invention will now be described, by way of example, with reference to the accompanying drawings, in which.

Figure 1:
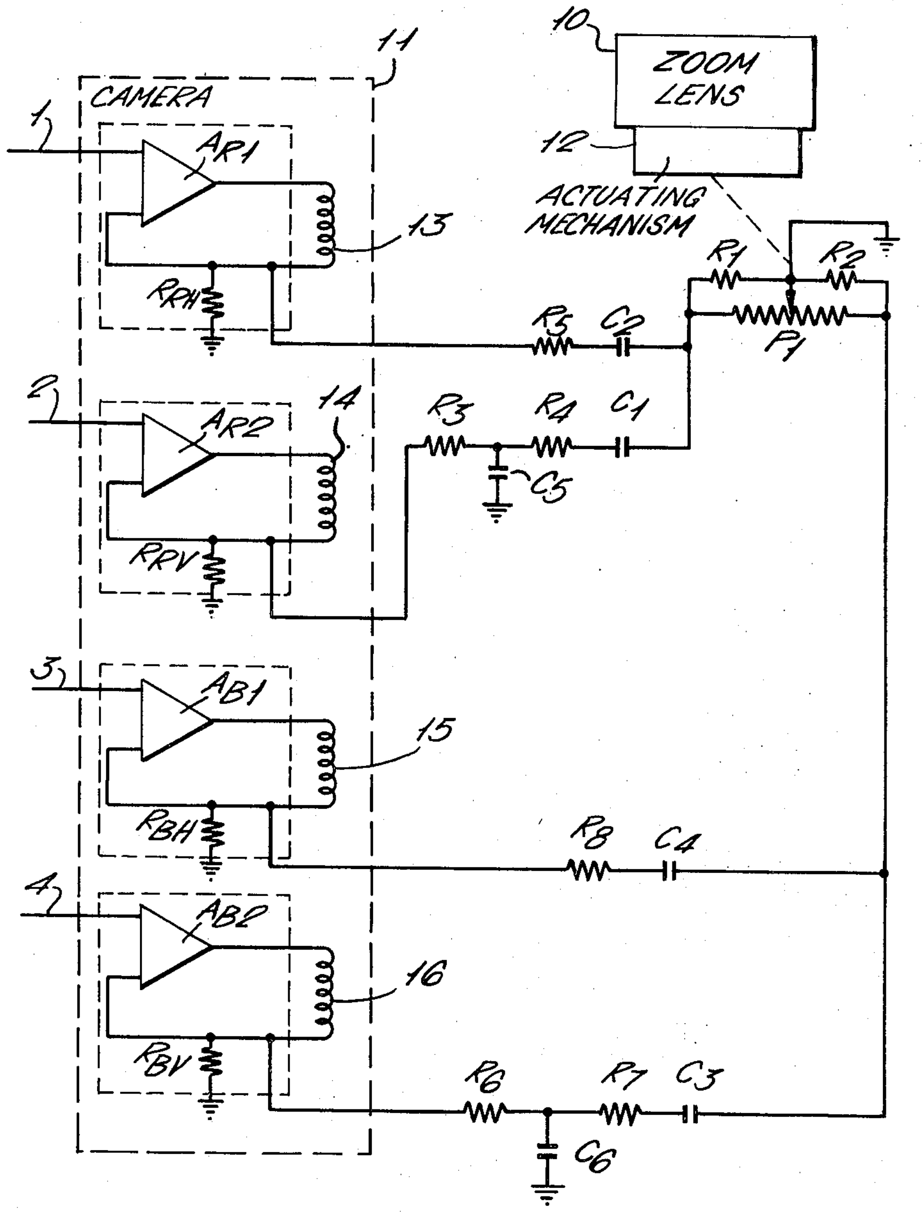
FIG. 1 is a circuit diagram of one embodiment of the invention.

Referring to FIG. 1, a zoom lens 10 has a zoom actuating mechanism 12. A potentiometer $P_1$ is coupled to be driven by the actuating mechanism 12 by any suitable means, indicated diagrammatically by 13, such as gears, belts, or a flexible drive. The potentiometer $P_1$ is used to modify the scan, as will be described, of an associated colour television camera which, as indicated by the dashed line 11, contains red horizontal and vertical scanning coils 13 and 14 respectively, and corresponding blue scanning coils 15 and 16. The green tube acts as the reference and its coils are therefore not shown. The basic control of red and blue scanning is by signals applied to inputs 1–4 to respective scanning amplifiers $A_{R1}$, $R_{RZ}$, $A_{B1}$ and $A_{B2}$.

The potentiometer $P_1$ may be linear or non linear. Resistors $R_1$ and $R_2$ are used to further modify the law of the potentiometer $P_1$ if required.

One end of the potentiometer $P_1$ is connected via resistorcapacitor networks $R_3R_4R_5C_1C_2C_5$ to the two current sensing resistors $R_{RV}$ and $R_{RH}$ used in the red channel whilst the other end of the potentiometer $P_1$ is connected via resistor-capacitor networks $R_6R_7R_8C_3C_4C_6$ to the current sensing resistors $R_{BV}$ and $R_{BH}$ of the blue channel. This configuration using one potentiometer to serve two channels is acceptable for correction of registration if the deviation of the blue channel varies in an approximately complementary manner to that of the red channel for any particular type of lens when the required zoom position is attained and when the values of $R_{RH}$, $R_{RV}$, $R_{BH}$ and $R_{BV}$ are approximately equal. In the diagram the value of the potentiometer $P_1$ together with the values of the resistors $R_3$ and $R_4$ are set so as to give the required variation of impedance across $R_{RV}$ as the zoom setting is changed from one end of the range to the other. As the effective value of $R_{RV}$ is reduced when the wiper of the potentiometer $P_1$ approaches end R, the voltage developed across $R_{RV}$ will be reduced; this in turn will cause the error signal between the two inputs 1 and 2 of an amplifier $AR_2$ in the red vertical deflection circuit to increase thus causing more current to flow in the scan coil to equalise the voltage across $R_{RV}$ and the input 2 to the amplifier. As the input waveform to the input 2 is a sawtooth voltage so also will be the waveform of the voltage across $R_{RV}$. Variation of the effective value of $R_{RV}$ (with the shunting network from $P_1$) will therefore produce a variation in the magnitude of the sawtooth current waveform through the relevant scanning coil 14 and hence the magnitude of the vertical scanned area on the red tube.

Capacitor $C_1$ is used to block DC and low frequency signals from the wiper of the potentiometer $P_1$. Capacitor $C_2$ is used to block DC and low frequency signals (DC and low frequency components of current result when the potentiometer wiper moves when zooming) and the horizontal scanning signals getting through to the vertical scanning circuit; as the vertical scanning frequency is at least 1/200 the horizontal scanning frequency the value of $C_1$ is usually much larger than that of $C_2$. Capacitor $C_5$ is used to smooth any remaining ripple getting through $C_1$ and stop any flyback frequencies passing from the vertical to the horizontal scanning circuits. The values of the capacitors are chosen so that they do not significantly alter the waveform of signal through $R_{RV}$ and $R_{RH}$ and hence the waveform of the deflection current through the coils.

The $R_6R_7R_8C_3C_4C_6$ network works in a similar fashion in conjunction with the blue channel.

Obviously if the misregistration effects in red are not in any way complementary with blue it would be necessary to use one potentiometer for the red channel and another for blue both mechanically coupled to the zoom movement.

The earth referred to in the diagram (and subsequent diagrams) is the technical or video earth of the camera not mains earth.

The circuit of FIG. 1 may be modified to reduce loading effects on the sensing resistors $R_{RV}$, $R_{RH}$, $R_{BV}$, and $R_{BH}$ and yet still obtain the necessary current variation in the scanning coils as the lens is zoomed.

Using this modification it is possible to have a defined position of zoom that will not produce any significant loading effect across the sensing resistors, this property being considered a desirable feature. As the lens is zoomed away from this defined position the loading effect will vary. If the defined zoom position (for no loading) is taken in the middle of the range of zoom then the impedance of the shunting network across the sensing resistor must contain a device whose impedance can go both negative and positive; the actual value and sign depending upon zoom position. By taking the defined position of zoom at the end of one of the zoom ranges, however, it is possible to use a shunting circuit that contains only positive impedances.

Figure 2:
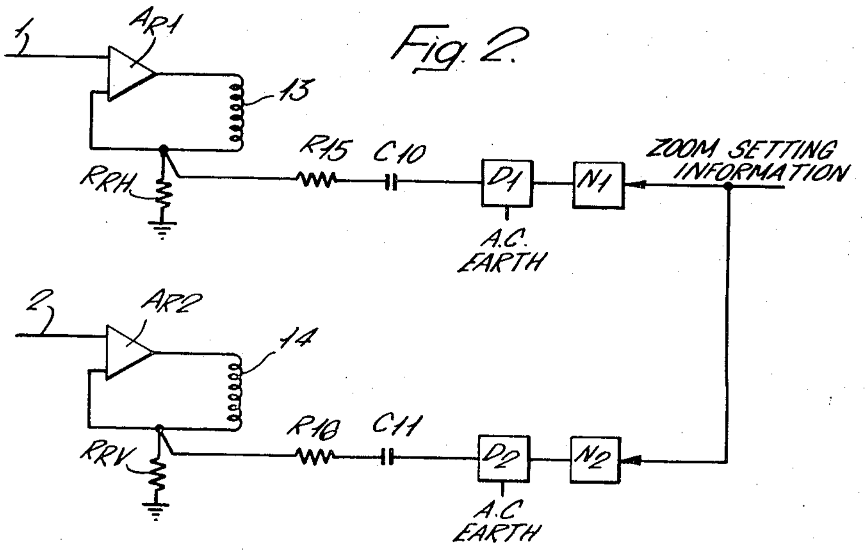
FIG. 2 illustrates in a general form a modification of FIG. 1.

Referring to FIG. 2 which shows the modification as applied to the red channel only, the impedance of device $D_1$ is made to be very high when the lens is zoomed to one end. As the device is grounded to an AC earth it will shunt the horizontal sensing resistor $R_{RH}$ together with resistor $R_{15}$ and capacitor $C_{10}$ but by suitable choice of values of $R_{15}C_{10}$ and $D_1$ this effect can be made insignificant. As the lens is zoomed to its other end the device $D_1$ alters its impedance to a progressively lower value until at the other end of zoom it has a very small impedance (much lower than $R_{15}$). Also the impedance of $C_{10}$ is arranged to be small compared with R at the horizontal scanning frequency so that effective shunting across $R_{RH}$ will be due to $R_{15}$. The value of $R_{15}$ is made such as to shunt $R_{RH}$ sufficiently to produce an increase in the horizontal scanning coil current and thereby eliminate the misregistration of the red horizontal channel to green.

A similar argument applies to the shunting of the vertical sensing resistor $R_{RV}$ by $R_{16}$, $C_{11}$ and $D_2$. The actual values of $R_{16}$ $C_{11}$ and $D_2$ however will depend upon the value of $R_{RV}$ (this is generally different to $R_{RH}$).

Netowrks $N_1$ and $N_2$ are also included in this modification and they constitute biasing networks to the variable impedance devices $D_1$ and $D_2$ respectively. The networks $N_1$ and $N_2$ can comprise either or both passive and active elements and may have either linear or non linear transfer characteristics (the zoom setting information being considered as the input). The transfer characteristics of $N_1$ and $N_2$ would in general be similar. The law between the variable impedance device $D_1$ and the zoom setting information can be achieved whether it be linear or non linear by combining the separate laws of input to output of the network say $N_1$ and the impedance $D_1$.

Obviously the zoom setting information at the input to networks $N_1$ and $N_2$ could be in the form of a voltage, current or impedance according to the nature of networks $N_1$ and $N_2$ and $D_1$ and $D_2$.

The above arrangement for the red channel can also be used on any or all of the colour channels.

Figure 3:
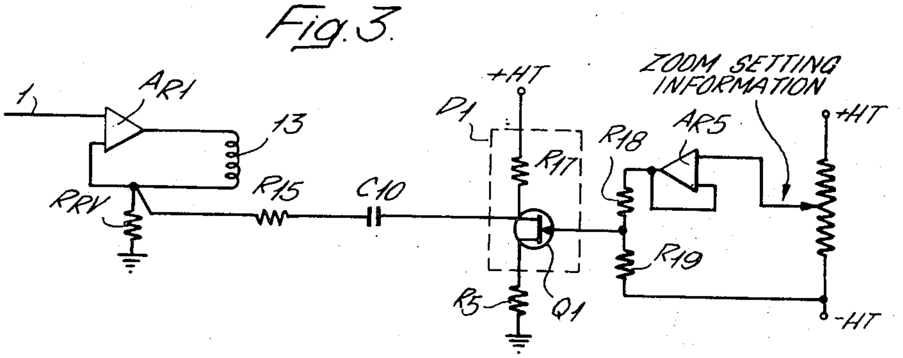
FIG. 3 is a circuit diagram of one specific form of the modification of FIG. 2.

A specific example of the invention in this form is shown in FIG. 3 which refers for simplicity to the red horizontal channel only. Here the variable impedance device $D_1$ comprises a field effect transistor (FET) $Q_1$ and a resistor $R_{17}$. The effective impedance of the FET $Q_1$ is altered by altering the DC bias between its gate terminal and source terminal; this is assisted by the provision of a bias resistor $R_5$ between the source terminal and earth. The FET receives its DC power from a DC power supply via the resistor $R_{17}$ (this power being referred back to the video earth).

Obviously the shunting effect on $R_{RH}$ will depend upon the series impedance at scanning frequency of $R_{15}$, $C_{10}$ and the parallel combination of $R_{17}$ and $Q_1$.

The biasing of the FET $Q_1$ is arranged so that at one end of zoom it is switched hard on and at the other end it is switched off. When the FET $Q_1$ is switched hard on it has a low resistance (small compared with $R_{15}$) between its output terminals. Therefore the shunting impedance will be approximately $R_{15}$; when the FET $Q_1$ is switched off, the shunting impedance will approximate to $R_{15}+R_{17}$ and as $R_{17}$ is large even compared with $R_{15}$ the shunting effect will be minimal. In practice the value of $R_{15}$ is made about 0.5 percent of $R_{RH}$. The actual value, however, will depend upon the required compensation for misregistration. Ideally the frequency response of the FET $Q_1$ should be such that at frequencies up to about twenty times that of the scanning frequency the device should be substantially resistive.

Obviously it is possible to use other forms of transistor as part of $D_1$, for example metal oxide insulated gate of either enhancement or depletion, type and ordinary bipolar transistors both n.p.n. and/or p.n.p. Also it is possible to use devices such as analogue multipliers and, if the zoom setting information is in digital form, digital to analogue converters.

Device $D_1$ may also comprise devices such as voltage dependent resistors whose impedance varies non linearly with current fed, for example, from current sources, or combinations of resistors and zener diodes whose reference voltages are arranged, together with the resistors, to provide the required law of impedance of $D_1$ according to the zoom setting information. It is also possible to achieve this law by switching transistors connected across resistive ladder networks.

Biasing of the transistor will depend upon the type of transistor used in $D_1$ and also on the law relating the impedance variation of $D_1$ to zoom setting information. In the FIG. 3 an amplifier $AR_5$ as a voltage follower merely changes the impedance of the zoom setting signal into the bias network comprising resistors $R_{18}$ and $R_{19}$, $R_{19}$ being taken down to the negative supply feeding the zoom setting information potentiometer $P_1$. In this arrangement the transistor $Q_1$ will be fully on when the zoom setting information is fully positive and off when it is fully negative. Although this is shown for a balanced power supply, the same effect at the transistor $Q_1$ can be obtained with one power supply and earth.

In the arrangement shown zoom setting information for the red vertical channel and other channels can be taken from either the input or output of the voltage follower.

Using the biasing network consisting of the voltage follower and resistors $R_{18}$ and $R_{10}$ a linear relationship is achieved between zoom setting information and bias voltage.

A non linear relationship can be achieved in many ways, however, according to the required law, for example instead of using a voltage follower a logarithmic amplifier could be used to give a logarithmic relationship. Other special laws may be achieved by synthesising the characteristics using a number of diodes and/or transistors and/or zener diodes and/or non linear resistive networks in place of or together with $R_{18}$ and $R_{19}$. The synthesis may achieve a smooth law between the zoom setting information and the output of the bias network or may achieve a piece wise linear approximation to the required law.

Figure 4:
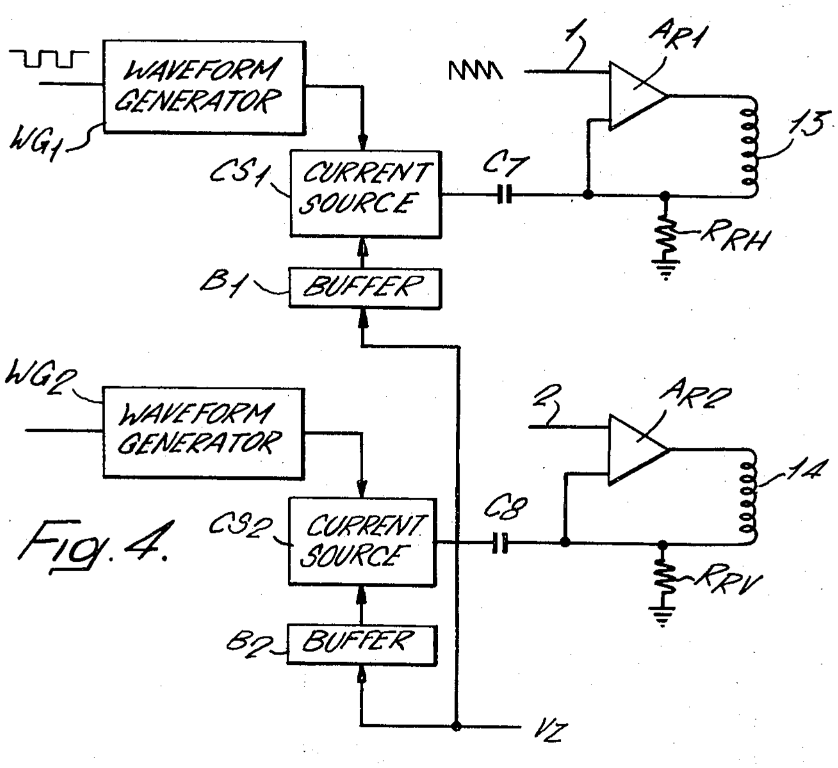

Whereas in the above diagrams reference is made to the use of a voltage follower between the zoom setting information and the bias network $N_1$, it is to be understood that the operational amplifier so used may in fact be used to provide voltage/current gain, inversion and/or summing of signal to achieve the required signal into $N_1$. Modification of current through the scanning sensing resistors when the lens is zoomed can also be achieved by feeding current (having the same waveform and same time relation to and being additive or subtractive with the driving voltage) through the resistors using a current source. Once again as the sensing resistor forms part of the negative feedback loop controlling current through the scan coil an increase in current through the sensing resistor will effect a reduction in current through the scan coil and vice versa. The current source can be dependent upon the resistance to earth presented by the wiper and one end of a potentiometer arranged as in FIG. 1. Alternatively it may be dependent upon say a voltage or current that varies with the position of zoom. For example the current source could be controlled by a zoom indication voltage already brought back into the camera from the lens for display purposes as descriped in out U.S. Pat. No. 1,141,662. FIG. 4 shows such an arrangement for the red channel only, but this can be extended to any number of channels. In FIG. 4, like references identify like parts as in FIG. 1.

The zoom indication voltage $V_Z$ is applied through buffer amplifiers $B_1$ and $B_2$ to current sources $CS_1$ and $CS_2$ forming part respectively of the horizontal and vertical drive channels. Horizontal and vertical drive pulses are derived in the camera in a known manner and applied to respective waveform generators $WG_1$ and $WG_2$, whose function is to synchronise the output of the current sources $CS_1$, $CS_2$ with the input scan voltages applied to the horizontal and vertical deflection amplifiers $A_{R1}$, $A_{R2}$ via terminals 1 and 2. The output of the current sources $CS_1$, $CS_2$ are then applied to the amplifiers $A_{R1}$, $A_{R2}$ and the sensing resistors $R_{RH}$, $R_{RV}$, $C_7$, $C_8$ (which act to block DC and low frequency signals) to control the respective scan coil current.

Figure 5:
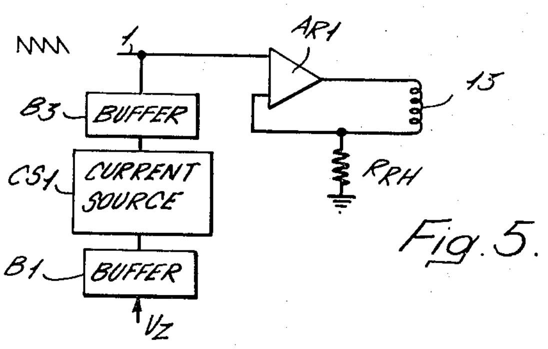
FIGS. 4 and 5 illustrate further modifications of FIG. 1.

The formation of the current waveform can be obtained in other ways such as replacing the drive pulses and waveform generators WG1 and WG2 by buffer amplifiers such as $B_3$ (FIG. 5) and taking the waveforms directly off the input terminals 1 and/or 2. FIG. 5 shows this for the red horizontal scan only. It is possible, of course, to use the outputs of waveform generators already in existence in the camera itself, for example those that are used to form the waveform at input terminal 1.

It should be understood that the waveform being fed to the current sensing resistor via capacitor $C_7$ and current source $CS_1$ in both FIGS. 4 and 5 would be similar in waveform to that in the scan coil and would be in the same time relation with this coil current and could be additive or subtractive to this coil current according to the position of zoom.

Figure 6:
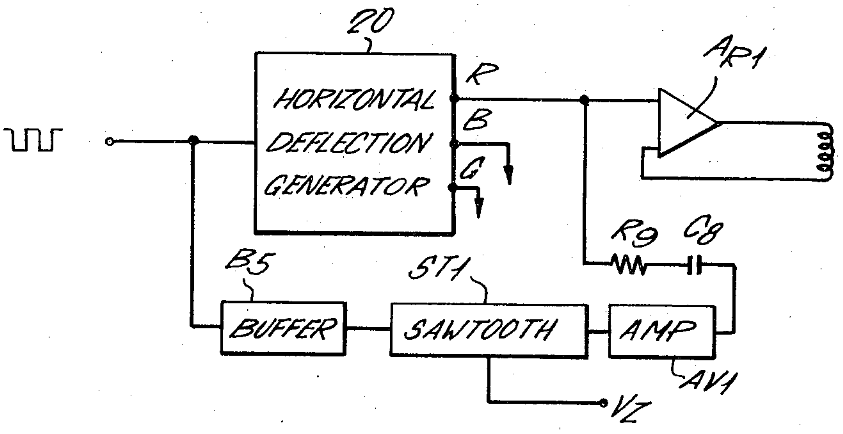
FIG. 6 is a circuit diagram of a second embodiment.

In a second embodiment, compensation is achieved by modifying the input to the deflection amplifier. FIG. 6 illustrates this for the red horizontal channel varied in dependence on zoom setting. The zoom setting signal $V_Z$ is applied via a buffer $B_6$ to a sawtooth generator $ST_1$. The output amplitude of the generator $ST_1$ is determined by the zoom position signal $V_Z$ and may be positive or negative, while it is synchronised in phase with the basic deflection waveform by means of camera horizontal drive pulses applied to it via a buffer $B_5$. This output is then passed via an amplifier $A_{V1}$, a low-frequency blocking capacitor $C_8$ and a resistor $R_9$ to the input of the horizontal deflection amplifier $A_{R1}$. The resistor $R_9$ is used to adjust the signal level applied to the amplifier $A_{R1}$. The Red output of the camera horizontal deflection generator 20 is also applied in the usual way to the input of the amplifier $A_{R1}$, whose resultant input is thus the basic deflection waveform plus or minus the inphase signal from the generator $ST_1$, dependent on the zoom setting.

Figure 7:
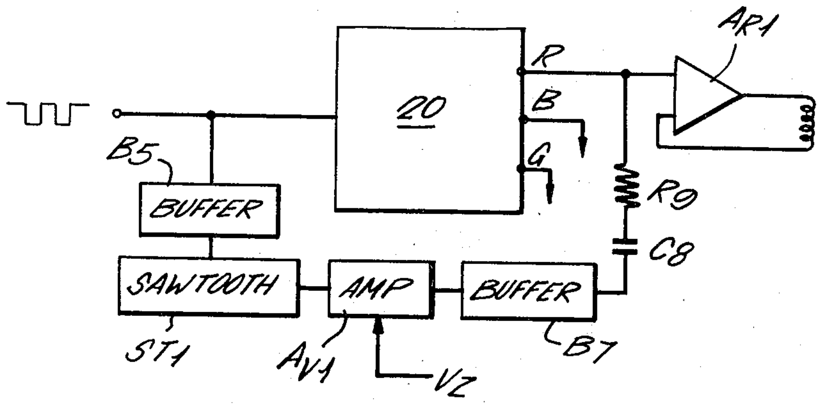
FIG. 7 illustrates a modification of FIG. 6.

In a modification of this embodiment, shown in FIG. 7, the output of the sawtooth generator $ST_1$ is constant and the gain of the amplifier $A_{V1}$ is varied in dependence on the zoom setting. In this case, a buffer $B_7$ between the amplifier $A_{V1}$ and the capacitor $C_8$ is needed.

As it is usually desirable to maintain a good sawtooth of current through the deflection coil it is necessary to endeavour not to distort this waveform with these additional signals dependent upon zoom lens operational parameters. Howevedr, in some special circumstances it may be required to distort this scan coil waveform with these modifying signals either to modify the linearity of the waveform in an effort to achieve a better picture outside zone 1 (the central portion) of the picture or to modify the waveform to achieve some special effect to the viewer. In this case, using the invention, it is possible to modify the scanning waveform by say feeding into $R_{RV}$ (and $R_{RH}$, $R_{BV}$ etc.) deliberately distorted waveforms or by feeding distorted voltage waveforms into the terminal 1, 2 etc. of the deflection amplifiers.

Similarly it would be possible to feed undistorted or distorted waveforms dependent upon the zoom operational parameters into the linearity and skew controls in the camera deflection generator.

Another method of achieving compensation for misregistration, particularly on new cameras, is the inclusion on each of the colour tubes of a small compensation coil that is fed directly from circuits generating suitable waveforms for scanning but dependent upon the zoom lens operational parameters.

It will be apparent that the invention can also be used for other types of deflection systems such as those using electrostatic deflection where modification of the voltage across the deflection plates would be used instead of modification of the coil current.

In the embodiments mentioned above the modifications have been applied to the individual deflection amplifiers corresponding to each of the camera scans. However, in many cameras differential registration signals exist that are used specifically to modify the scanning waveforms by small amounts so as to achieve registration for one particular setting of zoom. These differential signals merely add to or subtact from the master waveform generator to produce the required registration of the three colour channels. In general, there exists three differential signals controlling small variations of width (or height) linearity or skew for each of the colour channels and the controlling voltages are fed individually (or in a multiplexed manner) down to the camera via the camera cable.

Figure 8:
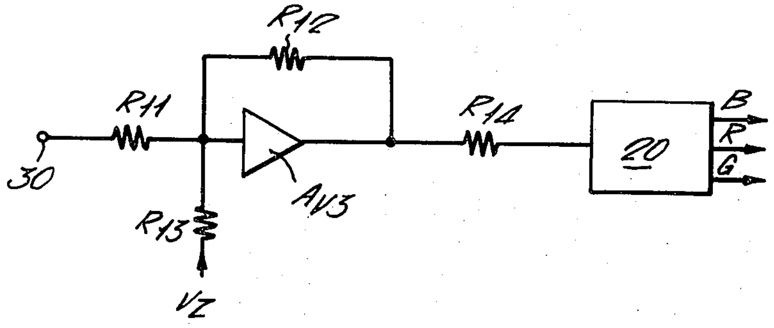
FIG. 8 illustrates part of a further embodiment.

Such as embodiment is illustrated in FIG. 8 with respect to modification of the red channel by zoom position.

The red width differential signal applied to an input 30 is fed via a resistor $R_{11}$ to a summing amplifier $A_{V3}$ provided with a feedback resistor $R_{12}$. The input of the amplifier $A_{V3}$ also receives the zoom position signal $V_2$ via an input resistor $R_{13}$. The resulting sum is fed via an output resistor $R_{14}$ to the red width control of the horizontal deflection generator 20. Resistors $R_{11}R_{13}$ and $R_{12}$ are used to control the relative sizes of the two input signals.

Generally both the remote red width control signal and the zoom position information (which could be obtained directly from the zoom indication signal say) are simple DC voltages and can therefore be summed by a straightforward low bandwidth operational amplifier. $R_{11}$ is made sufficiently large so as to make the effects of camera cable resistance insignificant. It is possible to replace the summing amplifier by a differential amplifier where the input signals are suitably attentuated to achieve the required balance of the signals. $R_{14}$ in the figure is used merely to provide the correct source impedance to the deflection generator.

In many cases it would only be necessary to modify the width (or height) of the scan by modifying the width (or height) differential control according to the condition of the zoom lens operational parameters (usually only zoom position) but for reasons explained above it may be necessary or desirable to modify the differential linearity signal and/or the differential skew signal or a combination of all three for both scans in all three tubes.

The above embodiments refer specifically to compensation for zoom setting, but it will be apparent to those skilled in the art that exactly the same techniques can be used to compensate for other parameters of the optical system, such as iris and focus where these are found to cause unacceptable misregistration. It will also be apparent that correction can be applied simultaneously for more than one of these parameters.

The chosen optical parameter or parameters can be used to modify the picture scanning in a monitor or receiver instead of the scanning of the camera tubes. Since however, this requires the transmission of signals representing the or each parameter it is preferred to operate on the camera scan.

The invention can be used in any television system in which more than one pickup scan is used.

We claim:

1. In a television camera having a zoom lens, a plurality of pickup tubes arranged to receive colour separation images and scan control means for controlling the scan of each pickup tube to form a raster of a given size the improvement which comprises means providing a signal representing the value of an operational parameter of the zoom lens and compensating circuit means for receiving said signal and modifying said scan control means to alter the raster size of at least one said pickup tube under control of said signal whereby the rasters in the pickup tubes maintain the same size relative to each other irrespective of changes in said operational parameter of the zoom lens.

2. The television camera defined in claim 1, including deflection coils for each tube and respective deflection amplifiers connected to said coils, wherein the scan control means comprises a deflection generator connected to said deflection coils through said amplifiers, aand wherein the compensating circuit means comprises signal generating means which selectively add to and substract from at least one output of the deflection circuit the said signal, the amplitude of which corresponds to the value of the operational parameter of the zoom lens.

3. The television camera defined in claim 2, wherein the signal generating means comprises a sawtooth wave generator, means synchronising said sawtooth generator in phase with the deflection generator, and means directly modulating the amplitude of the sawtooth wave output signal from the sawtooth wave generator in dependence upon the value of said operational parameter of the zoom lens.

4. The television camera defined in claim 3, including an amplifier having gain control means controlled by said parameter and means feeding the sawtooth signal from the sawtooth wave generator to the deflection generator output via said amplifier.

5. The television camera defined in claim 1, including deflection coils for each pickup tube and a sensing resistor arranged in series with each deflection coil, said compensating circuit means comprising means for applying the signal representing said operational parameter of the zoom lens across at least one of said sensing resistors.

6. The television camera defined in claim 5, including an actuating mechanism for varying the operational parameter of the zoom lens, wherein the compensating circuit means includes a potentiometer having a mechanical connection to said actuating mechanism.

7. The television camera defined in claim 5, wherein the compensating circuit means includes a variable impedance device and a biasing network by means of which the signal representing the operational parameter of the zoom lens is applied to the variable impedance device to vary the impedance of the latter.

8. The television camera defined in claim 1, wherein the scan control means comprise deflection coils for each pickup tube, respective deflection amplifiers connected to said coils, a deflection generator connected to the deflection coils through said amplifiers, and means providing at least one differential signal controlling the deflection generator, said compensating circuit means being connected to the differential signal means to modify the differential signal in dependence upon the value of the operational parameter of the zoom lens.

9. The television camera defined in claim 8, wherein the compensating circuit means comprises a summing circuit.

10. The television camera defined in claim 1, wherein the scan control means comprise deflection coils for each pickup tube, respective deflection amplifiers connected to said coils, and a deflection generator connected to said deflection coils through said amplifiers, the compensating circuit means including a variable current source connected to said scan control means and variable in response to said signal representing the operational parameter of the zoom leans to vary the drive voltage applied to the deflection coils.

11. The television camera defined in claim 1, wherein the lens parameter is selected from the zoom, iris and focus setting of the lens.

* * * * *